United States Patent [19]

Bergthaller et al.

[11] Patent Number: 4,579,817
[45] Date of Patent: Apr. 1, 1986

[54] COLOR PHOTOGRAPHIC RECORDING MATERIAL CONTAINING DYE-RELEASERS RELEASING 6-ARYLAZO-2-AMINO-3-PYRIDINOL DYES WHICH ARE CHELATABLE WITH METAL IONS

[75] Inventors: Peter Bergthaller, Cologne; Gerhard Wolfrüm, Leverkusen; Holger Heidenreich, Cologne, all of Fed. Rep. of Germany

[73] Assignee: Agfa-Gevaert Aktiengesellschaft, Leverkusen, Fed. Rep. of Germany

[21] Appl. No.: 638,965

[22] Filed: Aug. 8, 1984

[30] Foreign Application Priority Data

Aug. 18, 1983 [DE] Fed. Rep. of Germany ....... 3329774
Oct. 12, 1983 [DE] Fed. Rep. of Germany ....... 3337118

[51] Int. Cl.$^4$ .......................... G03C 1/40; G03C 5/54
[52] U.S. Cl. ...................................... 430/562; 430/223
[58] Field of Search ............... 430/222, 223, 225, 226, 430/562, 17; 260/146 R

[56] References Cited

U.S. PATENT DOCUMENTS

| | | | |
|---|---|---|---|
| 4,142,891 | 3/1979 | Baigrie et al. | 430/223 |
| 4,148,642 | 4/1979 | Chapman et al. | 430/223 |
| 4,193,916 | 3/1980 | Back et al. | 260/146 R |
| 4,195,994 | 4/1980 | Chapman | 430/223 |
| 4,272,434 | 6/1981 | Balgrie et al. | 260/146 R |
| 4,418,143 | 11/1983 | Bergthaller et al. | 430/223 |

*Primary Examiner*—Richard L. Schilling
*Attorney, Agent, or Firm*—Connolly and Hutz

[57] ABSTRACT

Dyes corresponding to general formula (I) are released imagewise from corresponding dye-releasers in the dye diffusion transfer process. They react with nickel ions to form lightfast, cyan dye-metal complexes having advantageous spectral properties:

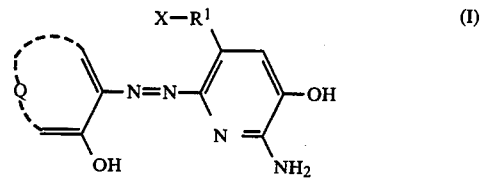

wherein
Q represents the group required for completing an optionally substituted phenyl or naphthyl group;
X represents —S—, —SO$_2$—, —SO$_2$—NR°— or —SO$_2$—O—;
R° represents H or alkyl; and
R$^1$ represents an aliphatic, araliphatic or a carbocyclic or heterocyclic aromatic group or, when X represents —SO$_2$—NR°—, R$^1$ represents hydrogen.

4 Claims, No Drawings

COLOR PHOTOGRAPHIC RECORDING MATERIAL CONTAINING DYE-RELEASERS RELEASING 6-ARYLAZO-2-AMINO-3-PYRIDINOL DYES WHICH ARE CHELATABLE WITH METAL IONS

This invention relates to a colour photographic recording material for the production of colour images by the dye diffusion transfer process, containing, associated with at least one light-sensitive silver halide emulsion layer, a so-called dye-releaser, i.e. a non-diffusible colour-providing compound, from which a diffusible 6-arylazo-2-amino-3-pyridinol dye capable of forming a complex with metal ions is released in the process of development.

The basic principle of the dye diffusion transfer process consists in that development gives rise to an imagewise distribution of diffusible dyes in a light-sensitive element in accordance with a previous exposure and this distribution of dyes is transferred to an image receptor element. In some cases, the lightfastness of colour images produced by such a process may be improved in known manner by using dyes capable of forming complexes with metal ions, e.g. dyes which form stable dye-metal tridentate complexes when subsequently treated with suitable metal ions. The improvement in light-fastness which complex formation with metal ions may impart to azo dye images produced by the dye diffusion transfer process or some other photographic process, such as the silver dye bleaching process, has been disclosed, for example, in DE-B-1,116,532 or DE-B-1,125,279.

6-arylazo-3-pyridinol dyes which may be released from dye-releasers and form coloured complexes with metal ions have been disclosed in U.S. Pat. No. 4,142,891, U.S. Pat. No. 4,195,994 and U.S. Pat. No. 4,142,292. The known dyes contain in the aryl moiety a group capable of chelate formation in a position adjacent to the azo group and accordingly react with metal ions to form cyan or magenta dye-metal tridentate complexes which are said to have good spectral properties. Corresponding monoazo dyes carrying an amino group in the 2-position of the 3-pyridinol ring are also known. The metal complex image dyes obtained from these by metallization with nickel or copper ions, however, have a dull colour tone which is in no way comparable to that of the known cyan image dyes, such as the phthalocyanine dyes or the 4-(4-nitrophenylazo)-1-naphthol dyes. The resulting loss in quality vitiates the advantage of rapid diffusion or higher lightfastness and prevents technical application of these dyes.

Even more serious is the disadvantage of the unfavourable absorption of the 2-(5-nitro-2-pyridylazo)-1-naphthols mentioned in DE-A-2,740,719 and U.S. Pat. No. 4,147,544 and U.S. Pat. No. 4,165,238 and the 2-(5'-sulphamoyl-2-pyridylazo)-4-alkoxy-1-naphthols and 2-(benzothiazolyazo)-1-naphthols mentioned in U.S. Pat. No. 4,204,870 and U.S. Pat. No. 4,207,104, which are found to be so-called "false" cyan dyes due to the high subsidiary densities thereof in the wavelength region of blue light.

It is an object of the present invention to provide dye-releasers for releasing monoazo dyes capable of post-metallization, which, in the form of metal complexes, are distinguished by exceptionally clear cyan colour tones and exceptionally good fastness to light.

It has been found that this problem may be solved by providing dye-releasers which release monoazo dyes corresponding to the following general formula (I):

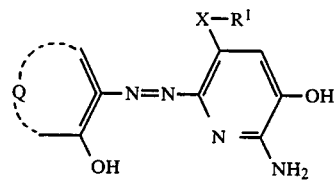

wherein

Q represents the group required for completing an optionally substituted phenyl or naphthyl group;

X represents —S—; —SO$_2$—, —SO$_2$—NR$^o$— or —SO$_2$—O—; wherein, in cases of doubt, the sulphonyl group (—SO$_2$—) is attached to the pyridinol ring;

R$^o$ represents hydrogen or alkyl; and

R$^1$ represents an aliphatic, araliphatic or a carbocyclic or heterocyclic aromatic group with the proviso that, when X represents —SO$_2$—O—, R$^1$ may only represent aryl, but, when X represents —SO$_2$—NR—$^o$, R$^1$ may also represent hydrogen.

The present invention relates to a colour photographic recording material for the production of colour images by the dye diffusion transfer process, containing, associated with at least one light-sensitive silver halide emulsion layer, a non-diffusible, colour-providing compound (dye-releaser) from which a diffusible 6-arylazo-2-amino-3-pyridinol dye capable of complex formation with metal ions is released under the conditions of alkaline development as a function of the development of the silver halide emulsion layer, characterised in that the 6-arylazo-2-amino-3-pyridinol dye corresponds to general formula (I).

The present invention also relates to a dye image consisting of an imagewise distribution of a cyan dye on a layer support, characterised in that the cyan dye is a nickel complex of a monoazo dye corresponding to general formula (I) or of a dye-releaser corresponding to general formula (IV).

Preferred dye-releasers according to the present invention release a monoazo dye corresponding to one of the following general formulae (II) or (III):

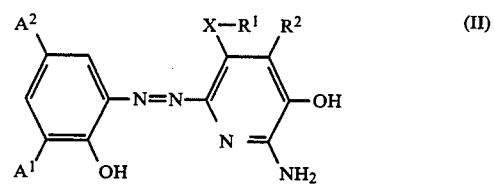

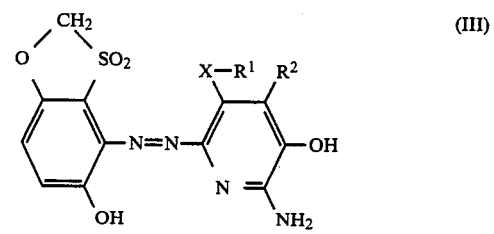

wherein X and R$^1$ are as defined above; R$^2$ represents H, halogen or a substituent having electron acceptor properties; and $A^1$ and $A^2$ represent substituents having electron acceptor properties;

$A^1$ preferably represents a strong electron acceptor, e.g. one of the groups —NO$_2$, —CN or —SO$_2$—R$^3$ wherein R$^3$ represents OH, an optionally substituted or optionally cyclic amino group, alkyl or aryl, while the electron acceptor character of $A^2$ is preferably weaker. Suitable examples for $A^2$ include halogen, in particular Cl, and —SO$_2$—R$^4$, wherein R$^4$ has substantially the same meaning as R$^3$; also —CF$_3$ and COOH.

An aliphatic group represented by R$^1$ may be, for example, an alkyl group having from 1 to 5 carbon atoms. An araliphatic group represented by R$^1$ may be, for example, benzyl or β-phenylethyl. A carbocyclic aromatic group (aryl) represented by R$^1$ may be, for example, phenyl. Examples of heterocyclic aromatic groups include pyrimidyl, benzimidazolyl and triazolyl. The above-mentioned groups may in turn be further substituted. A phenyl group, for example, may be substituted by amino, acylamino, alkoxy or carboxyl.

A substituent with electron acceptor properties represented by R$^2$ may be, for example, one of the substituents mentioned in the definition of $A^1$ and $A^2$, but not —NO$_2$; or it may be a phenyl or thienyl group optionally substituted with one of the above-mentioned substituents.

An amino group mentioned in the definition of $A^1$ or $A^2$ may be mono- or di-substituted, e.g. by alkyl, aralkyl, aryl, a heterocyclic group or acyl, e.g. alkylsulphonyl or arylsulphonyl. Examples of suitable cyclic amino groups include the pyrrolidine, piperidine, perhydroazepine, morpholine, N'-alkylpiperazine, indoline and tetrahydroquinoline groups.

Acyl groups (acylamino) are generally derived from aliphatic or aromatic carboxylic or sulphonic acids, carbamic acids, sulphamic acids or carbonic semi-esters.

An acylamino group represented by R$^3$ or R$^4$ may contain, for example, an alkylsulphonyl or arylsulphonyl group as the acyl group so that $A^1$ or $A^2$ may contain a disulphimide group.

The particulars given above completely described the chromophoric system of monoazo dyes released from the dye-releasers according to the present invention which is responsible for the spectral properties.

The dyes may in addition contain further suitable substituents to adapt them to particular purposes. For example, suitable functional groups for adjusting the diffusion and mordanting characteristics may be present in the released dyes in the form of one of the hydroxyl groups present or in the form of one of the groups mentioned above in the difinitions for R$^1$ to R$^4$, or in the form of substituents optionally attached to one of these groups through a suitable connecting member, e.g. the dyes may carry anionic groups or groups capable of anionisation, such as sulphonate, sulphinate, phenolate, carboxylate, disulphimide or sulphamoyl groups, or a functional group which may result from the splitting of a bond to a carrier group carrying a ballast group and which is characteristic of the nature of the carrier group and the bond by which it is attached thereto. The last-mentioned functional group may be the same as the previously-mentioned groups which modify the diffusion and mordanting characteristics. The functional group may be attached, for example, to an alkyl, hetaryl or aryl group which may in turn form part of one of the substituents mentioned under R$^1$ to R$^4$.

The 2-amino-3-pyridinol azo dyes described in DE-A-2,740,719 react with nickel or copper-II ions to form complexes ranging in colour from blue to bluish with a green tinge. According to the present invention, introduction of the group —X—R$^1$ into the 2-amino-3-pyridinol ring produces a bathochromic shift in the shade of the complexes without increasing the subsidiary colour densities. In addition, it is found that the resulting complexes, in particular the nickel complexes, provide cyan image dyes with exceptionally high lightfastness.

The dyes corresponding to general formulae (I), (II) and (III) released from the dye-releasers according to the present invention have the characteristic that the absorption spectra of the dyes are shifted towards shorter wavelengths compared with those of the complexes. An alkalilabile blocking of the chelate-forming hydroxyl groups by acyl groups or related protective groups is not required for this purpose, although acylation results in a further shift of the absorption of the chormophore towards shorter wavelengths. In addition, such blocking reduces the colour intensity so that the absorption of the layer in which the dye-releasers are incorporated does not interfere with the sensitization of the associated silver halide emulsion layer by a filter effect.

General formulae (I), (II) and (III) represent the diffusible dyes released according to the present invention in the process of development. These dyes are released from corresponding non-diffusible, colour-providing compounds (dye-releasers), incorporated in the layer. These may be compounds in which a dye residue corresponding to one of the above general formulae is attached to a carrier group CAR containing at least one ballast group, optionally with interposition of a suitable linking member.

Linkage of the dye corresponding to general formula (I) to the carrier group may be obtained, for example, by way of one of the substituents R$^1$ to R$^4$ or by way of an oxygen atom which constitutes the oxygen atom of a phenolic group in the released monoazo dye. The dye-releasing compounds according to the present invention may therefore be represented by the following general formula (IV):

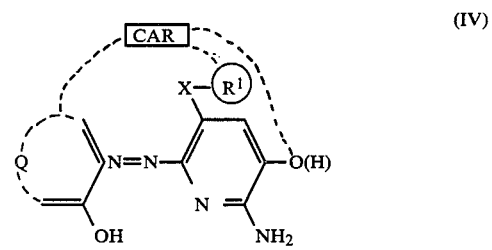

(IV)

wherein
Q, X and R$^1$ are as defined above;
CAR represents a redox active carrier group containing at least one ballast group;
and the broken lines represent possible linkage points.

In the dye-releasers according to the present invention corresponding to general formula (IV), the carrier group is therefore connected to the phenyl or naphthyl group completed by Q or to the oxygen atom of the hydroxyl group on the pyridine ring, optionally through a suitable intermediate member, or it may be present as substituent in the group represented by R$^1$. In the dye-releasers, the hydroxyl groups shown in general formula (IV) may be present in a masked form, e.g. in the form of a group of the formula O-acyl, wherein acyl is an acyl group capable of being hydrolyzed under alkaline conditions.

The carrier group represented by CAR contains, in addition to a ballast group, at least one group which may be split off as a function of the development of a silver halide layer, so that the dye attached to the carrier group may be separated from the ballast group, in some cases together with a small fragment of the original carrier group, and may thus be released from its attachment to the layer. The carrier groups may have various structures according to the mode of functioning of the releasable group.

The dye-releasers according to the present invention may belong to various of numerous types of compounds which are all distinguished by a linking member which is redox dependent in its binding strength and links the chromophore to the diffusion-resistant carrier group.

A comprehensive survey of this field may be found in Angew. Chem. Int. Ed. Engl. 22, (1983) 191–209, in which the most important of the known systems are described.

Redox-active dye-releasers corresponding to the following formula have proved to be particularly advantageous:

BALLAST-REDOX-DYE, wherein
BALLAST represents a ballast group;
REDOX represents a redox-active group, i.e. a group which is oxidizable or reducible under the conditions of alkaline development and undergoes to varying degrees an elimination reaction, nucleophilic displacement reaction, hydrolysis or other decomposition reaction, depending upon whether it is in the oxidized or reduced state, with the result that the DYE residue is split off; and
DYE represents the residue of a diffusible dye, in the present case a dye corresponding to general formula (I).

The ballast groups are groups which enable the dye-releasers according to the present invention to be incorporated in a diffusion-fast form in the hydrophilic colloids conventionally used in photographic materials. These groups are preferably organic groups, generally containing straight-chained or branched aliphatic groups generally having from 8 to 20 carbon atoms and optionally also carbocyclic or heterocyclic, possibly aromatic groups. These groups are attached to the remainder of the molecule either directly or indirectly, e.g. through one of the following groups: —NHCO—, —NHSO₂—, —NR— (wherein R represents hydrogen or alkyl), —O— or —S—. The ballast group may in addition also contain water-solubilizing groups, such as sulpho groups or carboxyl groups, which may also be present in an anionic form. Since the diffusion characteristics depend on the molecular size of the whole compound, it is in some cases sufficient to use relatively short-chained groups as ballast groups, e.g. when the molecule as a whole is large enough.

Redox-active carrier groups having the structure, BALLAST-REDOX- and suitable dye-releasers are known in various forms. A detailed description will not be given here in view of the above-mentioned comprehensive article in Angew. Chem. Int. Ed. Engl. 22, (1983) pages 191 to 209.

A few examples of redox-active carrier groups from which a dye is split off as a result of imagwise oxidation or reduction are given below purely for the purpose of illustration:

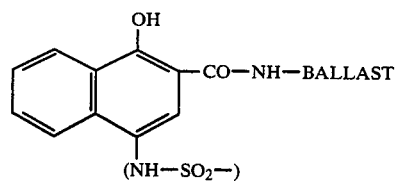

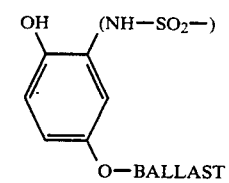

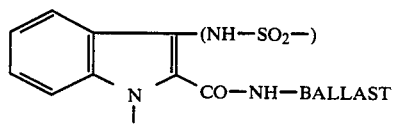

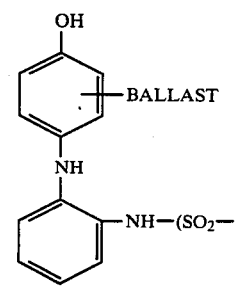

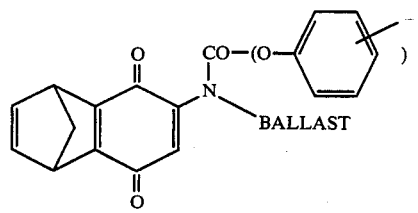

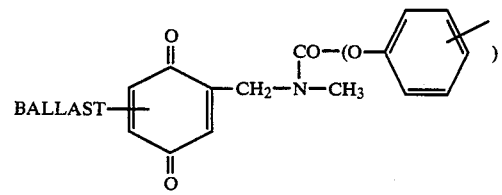

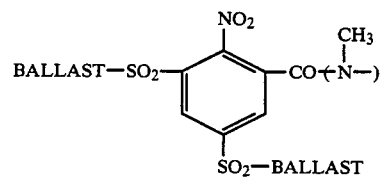

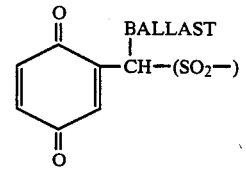

[Structural formula: cyclohexadienedione with CH(CH₃)—(SO₂—) and BALLAST substituents]

[Structural formula: CH₃—C₆H₄—CO—O— substituted benzene with NO₂, CH(CH₃)—(SO₂—), BALLAST—SO₂ and SO₂—BALLAST groups]

[Structural formula: BALLAST—SO₂—NH—C₆H₄—S⁺(—C₆H₄—NO₂)—(N⁻—SO₂—)]

The groups shown in brackets are functional groups of the dye residue and are removed together with the dye residue when the latter is released from the remaining part of the carrier group. The functional group may be one of the substituents mentioned in the definition of the groups $R^1$ to $R^4$ in general formulae (I), (II) and (III) and may exert a direct influence on the absorption and complex-forming properties of the dyes according to the present invention. On the other hand, the functional group may be separated from the chromophore of the dye according to the present invention by an intermediate member if it exists as a substituent in one of the groups defined for $R^1$ to $R^4$ without necessarily having an influence on the absorption or complex-forming properties. The functional group may, however, act in combination with the intermediate member to influence the diffusion and mordanting characteristics of the dyes according to the present invention. Suitable intermediate members may be, for example, alkylene or arylene groups.

The last-mentioned classes of reducible dye-releasers which may be split off by reduction are advantageously used together with so-called "electron donor compounds" (ED compounds). The latter function as reducing agents which are used up imagewise in the development of the silver halide and the portion which is not used up by development then reduces the associated dye-releaser to split off the dye. Examples of suitable ED compounds include non-diffusible or only slightly diffusible derivatives of hydroquinone, of benzisoxazolone, of p-aminophenol and of ascorbic acid (e.g. ascorbyl palmitate), which have been described, for example, in DE-A-2,809,716. Particularly suitable ED compounds are disclosed in DE-A-3,006,268. Examples of suitable ED compounds are illustrated below:

ED 1: [Structure with H₃C—N—CH₂CH₂SO₂NHC₁₈H₃₇ groups on a benzene ring with additional N—CH₃ and CH₂CH₂SO₂NHC₁₈H₃₇ substituents]

ED 2: [Naphthalenone structure with C₁₂H₂₅ and OH substituents]

ED 3: $C_{16}H_{33}SO_2HN$—C₆H₄—COCHCONH—C₆H₄—OCH₃, with —O—C(=O)—CH₃ branch

ED 4: [Benzisothiazolone-dioxide N—CH₂C(=O)—C₆H₄—NHSO₂—C₆H₄—CONH—C₆H₄—OC₁₄H₂₉]

ED 5: [Naphthalene with OH, SO₂NH(CH₂)₄O—C₆H₄—C₁₅H₃₁, HNCH₂—C₆H₄—OCCH₃(=O) substituents]

ED 6: [Benzofuranone structure with n-C₁₆H₃₃, n-H₇C₃, HO, CH₃, OH, phenyl substituents]

ED 7: [Benzofuranone structure with C₁₆H₃₃, CH₃O, HO, CH₃, OH, biphenyl substituents]

Examples of metallisable monoazodyes released from the dye-releasers are shown below to illustrate the present invention. Dye 1 is an intermediate product

| Dye | | Dye | |
| --- | --- | --- | --- |

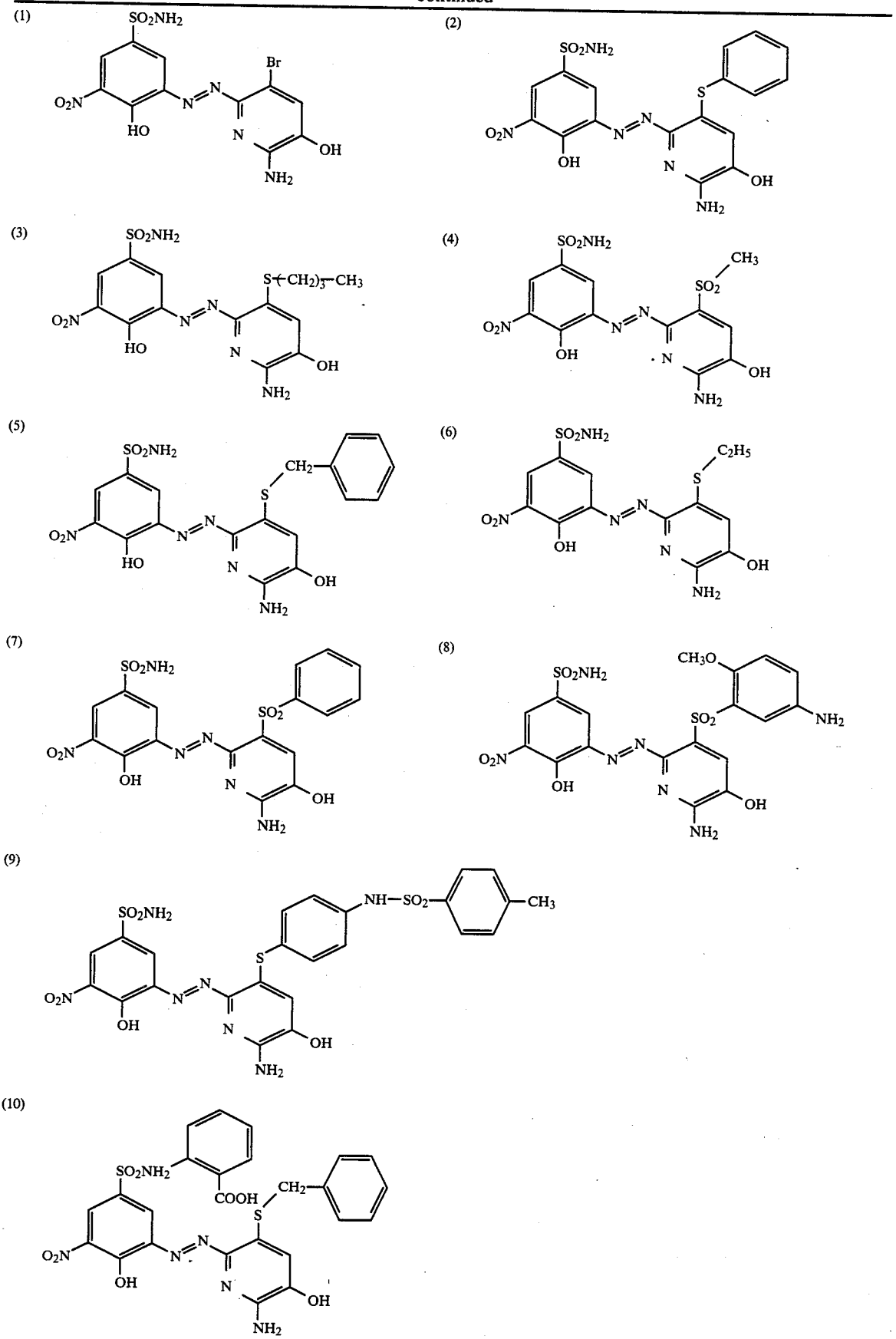

(11) 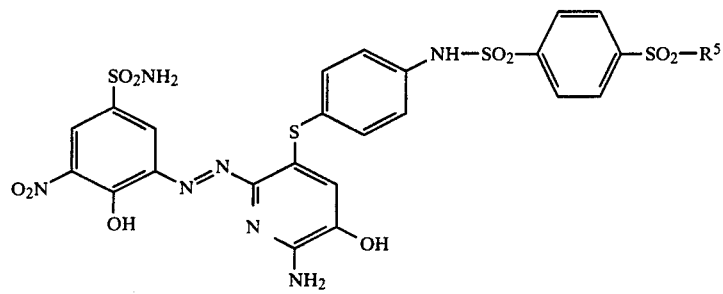
(a) released dye:
R⁵ = H
(b) dye-releaser:
R⁵ = CAR
(12) 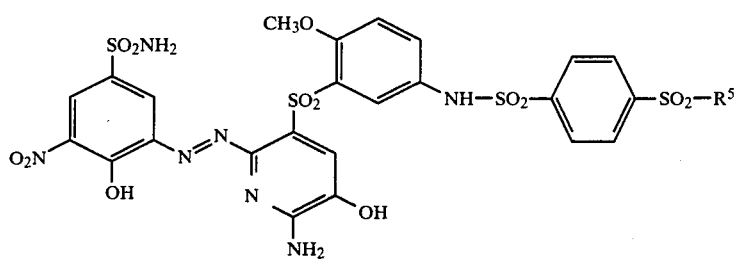
(a) released dye:
R⁵ = H
(b) dye-releaser:
R⁵ = CAR¹
(13) 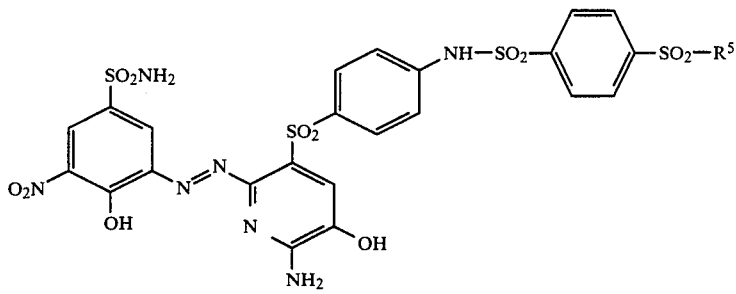
(a) released dye:
R⁵ = H
(b) dye-releaser:
R⁵ = CAR¹
(14) 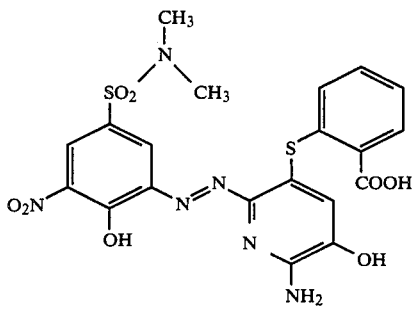
(15) 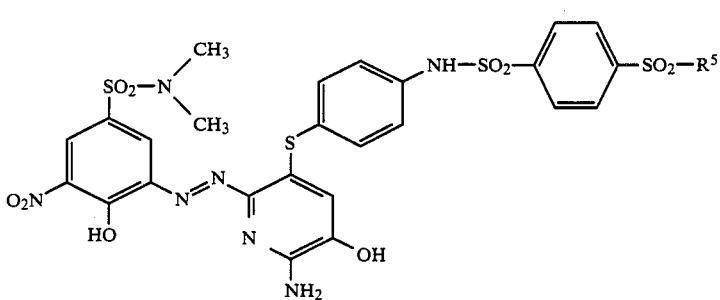
(a) released dye:
R⁵ = H
(b) dye-releaser:
R⁵ = CAR¹

-continued
(16) 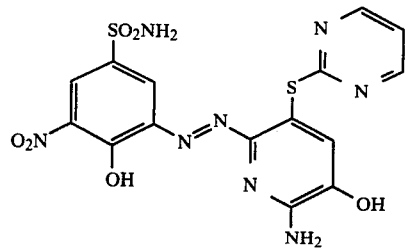
(17) 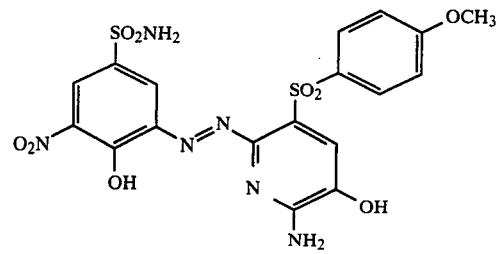
(18) 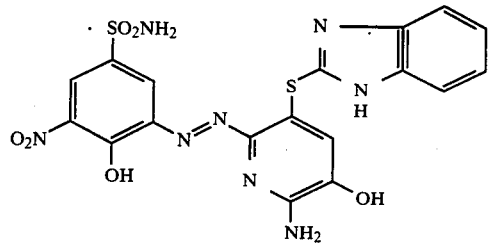
(19) 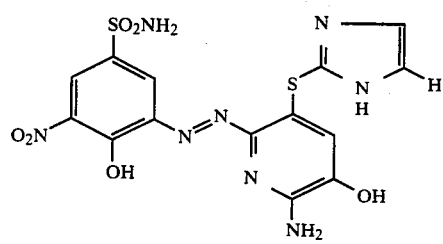
(20) 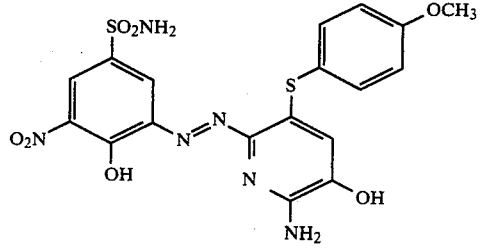
(21) 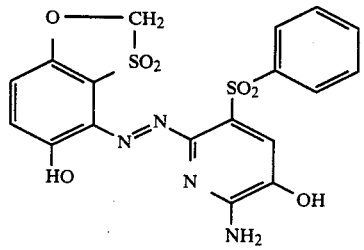
(22) 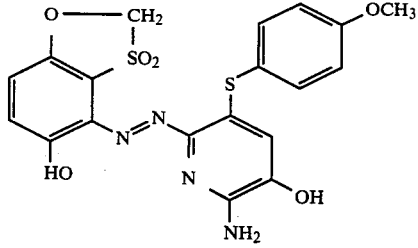
(23) 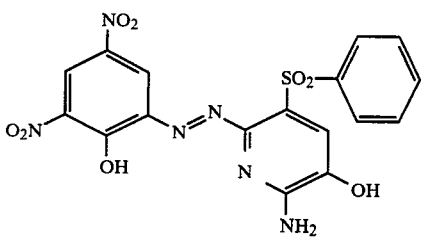
(24) 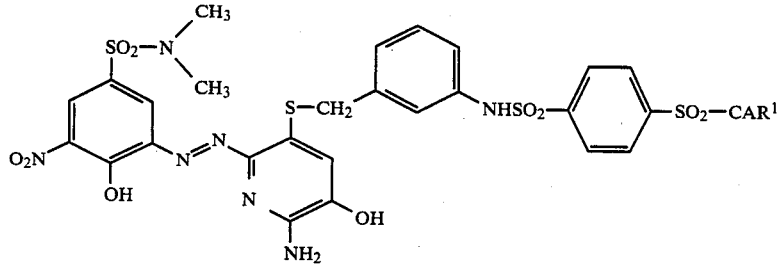
(25) 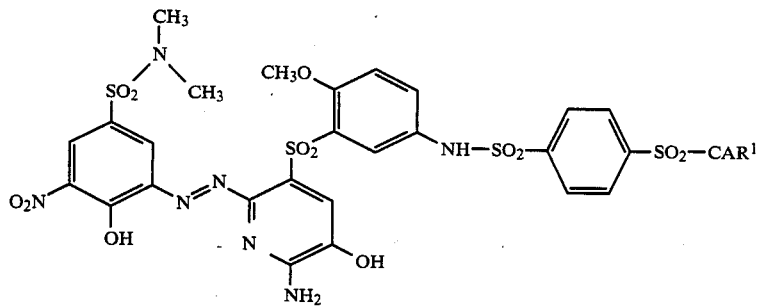

-continued
(26) 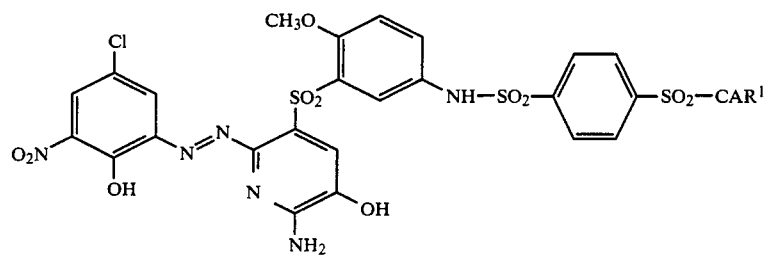
(27) 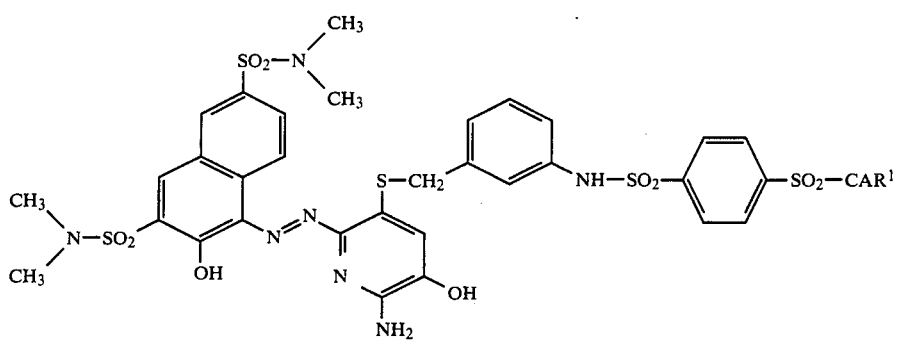
(28) 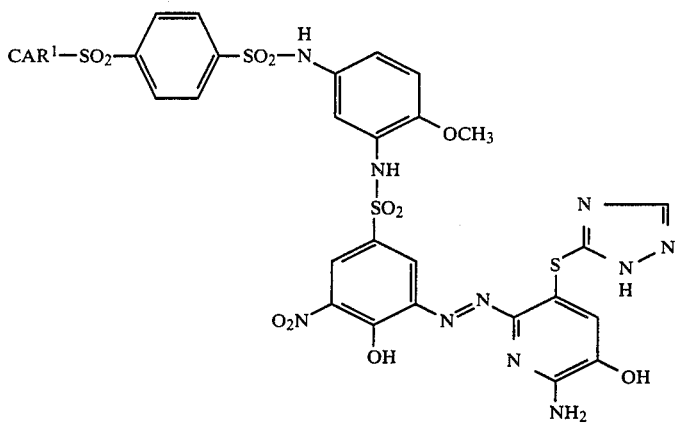
(29) 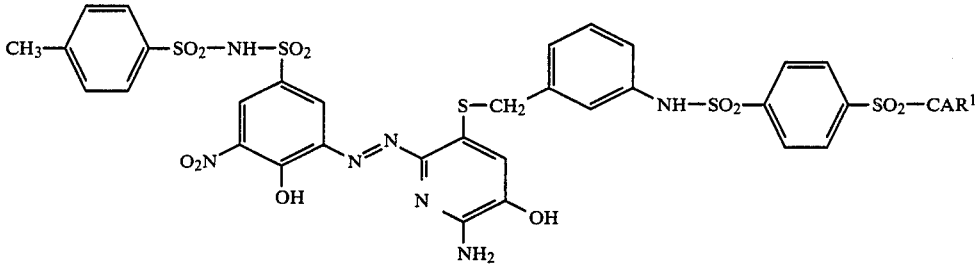
(30) 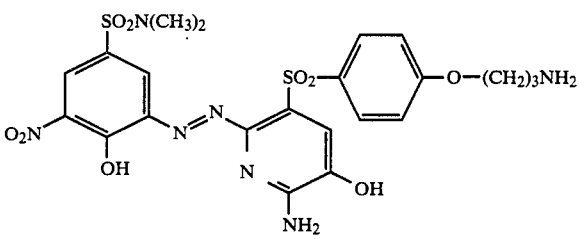

-continued
(31)
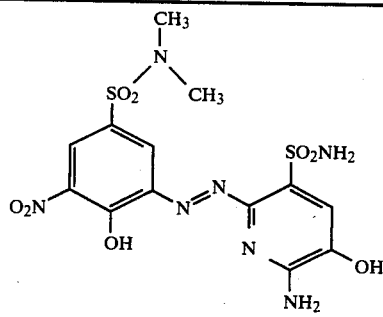
(32)
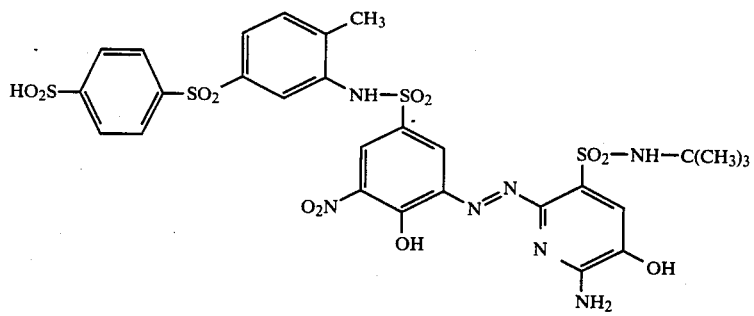
(33)
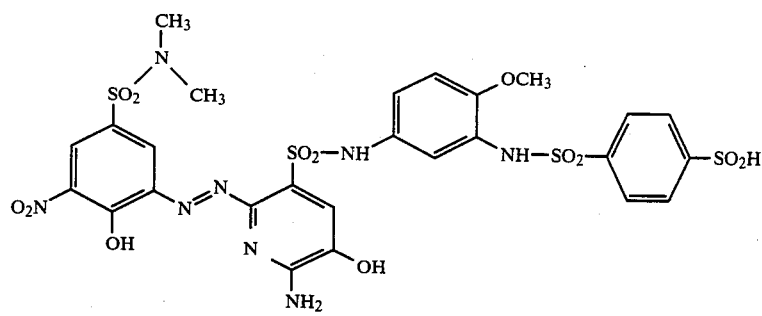
(34)
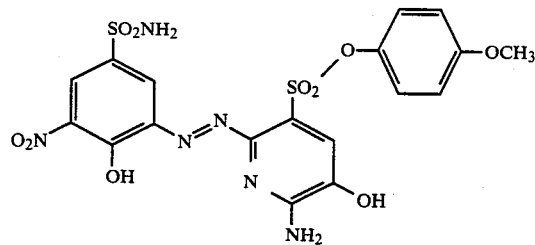
(35)
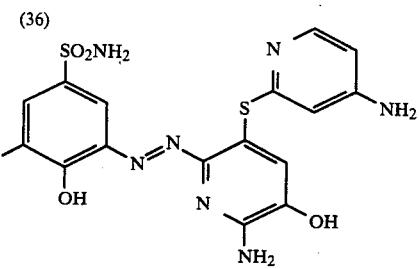
(36)
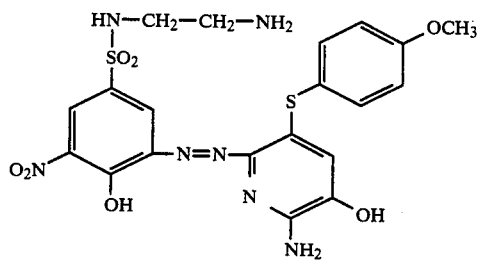
$CAR^1 =$
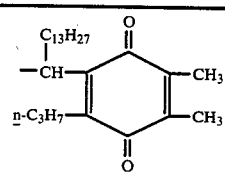

The dyes illustrated here may be diffusible dyes which have been released from dye-releasers, model dyes which may be linked to removable carrier groups by known methods of preparation, without interference in the lightfastness or absorption, to form dye-releasers, or they may be the dye-releasers themselves. According to the present invention, the diffusible dyes are released imagewise from the last-mentioned compounds in the process of development.

Examples of dye-releasers according to the present invention are illustrated below.

Dye-releaser 1 = Dye 11b
Dye-releaser 2 = Dye 12b
Dye-releaser 3 = Dye 13b
Dye-releaser 4 = Dye 14b

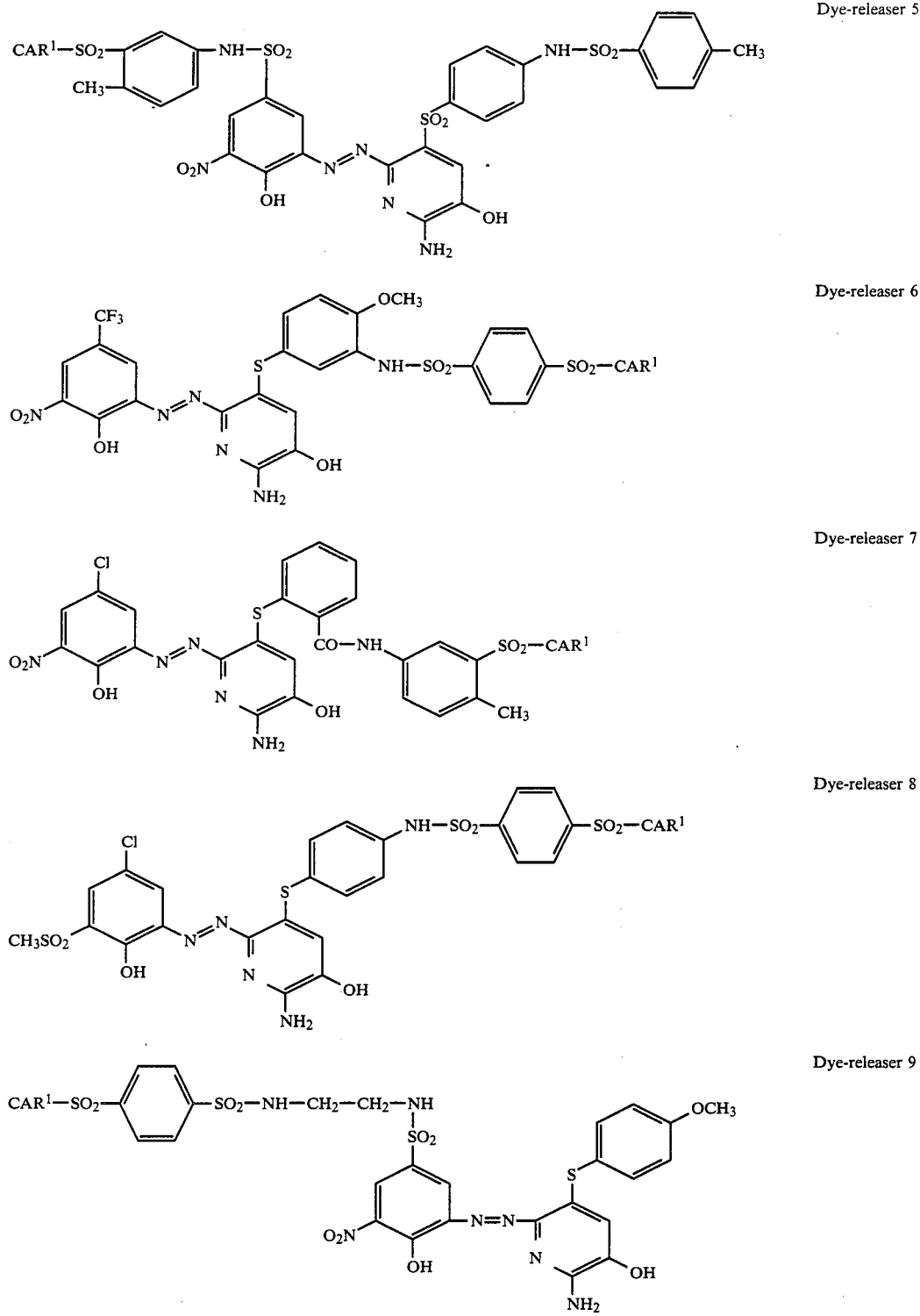

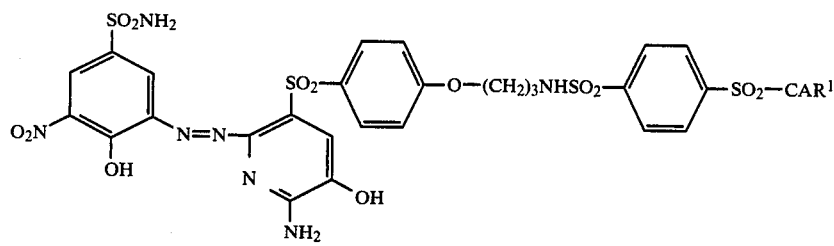

Dye-releaser 10

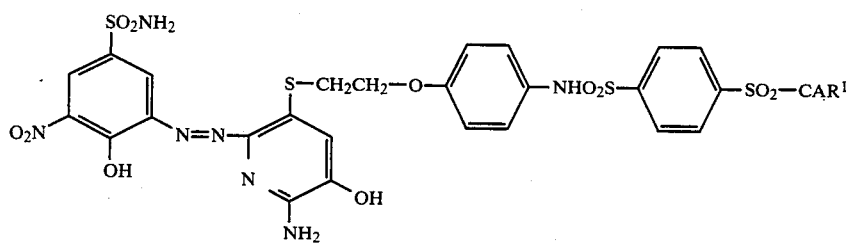

Dye-releaser 11

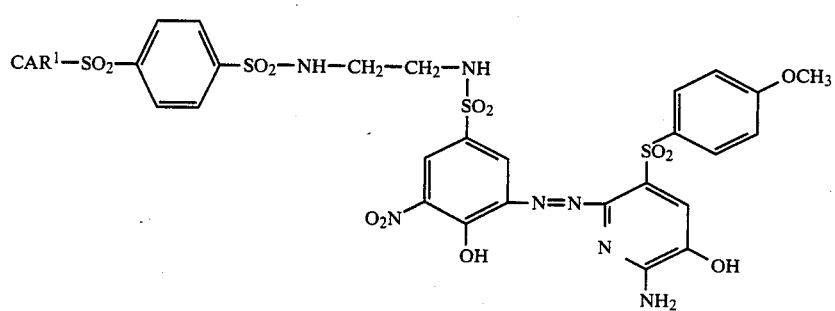

Dye-releaser 12

Dye-releaser 13 = Dye 25
Dye-releaser 14 = Dye 26
Dye-releaser 15 = Dye 27
Dye-releaser 16 = Dye 28
Dye-releaser 17 = Dye 29

Preparation of the dyes is carried out in known manner by coupling of a diazotised amine corresponding to general formula (VI):

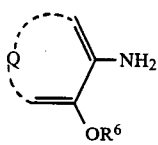

(VI)

wherein Q is as defined above, and $R^6$ represents H, $-SO_3H$ or acyl; with a halogenated 2-aminopyridinole-3 in an aqueous or aqueous-organic medium to form a dye corresponding to general formula (VII) as intermediate product:

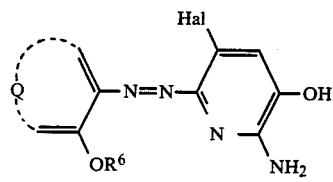

(VII)

wherein Q and $R^6$ are as defined above; and Hal represents Cl or Br.

The dye obtained as intermediate product, usually in a very pure form, is reacted in a further step, either with a thiol compound or with a sulphinic acid in the presence of a base to neutralise the hydrogen halide released. This reaction is known and has been described in DE-A-2,745,024.

The dyes may also be prepared in known manner by the coupling of a diazotised amine corresponding to general formula (VI) with a 2-amino-3-pyridinol-5-sulphonic acid aryl ester. 2-amino-3-pyridinol-5-sulphonic acid amides are known and have been disclosed, for example, in U.S. Pat. No. 4,395,477, U.S. Pat. No. 4,195,994 and U.S. Pat. No. 4,346,161. Some of the dyes and heavy metal comples thereof are also described there. The sulfonic acid derivatives of the dyes can also be made starting from the corresponding brominated dyes by exchange of the bromine atom as disclosed in DE-A-2-236 245 followed by known methods to provide the dye sulphonamides or dye sulphonic acid aryl esters. The aminophenols shown below ("amine") are suitable for use as diazo components:

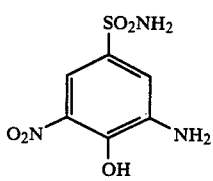

Amine 1

-continued
Amine 2
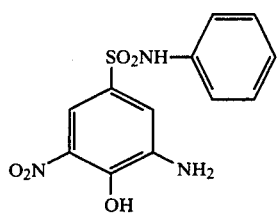
Amine 3
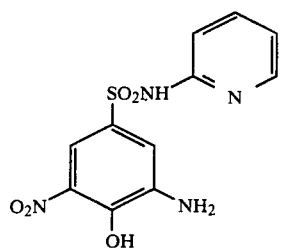
Amine 4
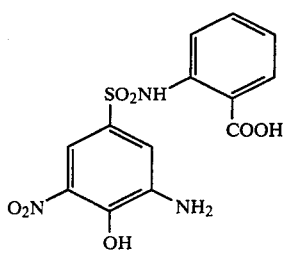
Amine 5
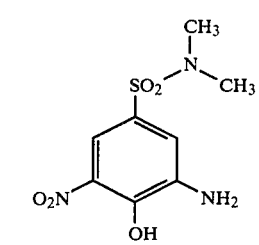
Amine 6
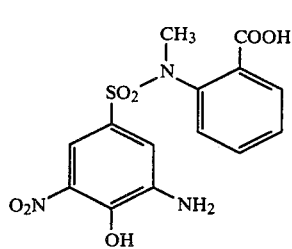
Amine 7
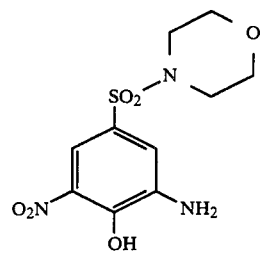
Amine 8
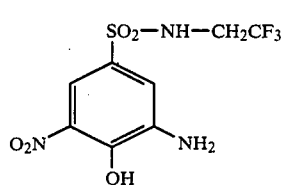
-continued
Amine 9
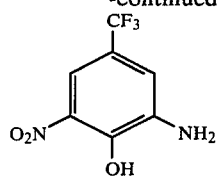
Amine 10
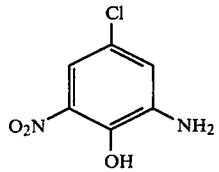
Amine 11
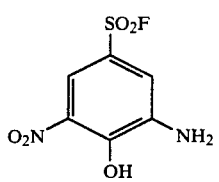
Amine 12
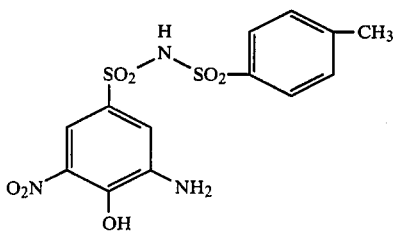
Amine 13
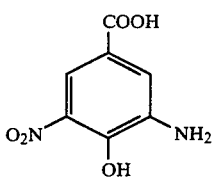
Amine 14
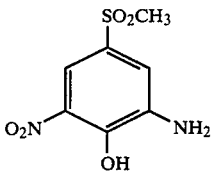
Amine 15
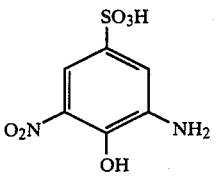
Amine 16
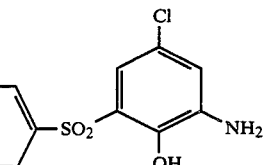
Amine 17
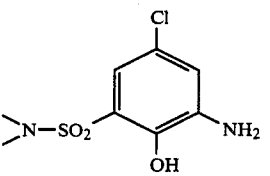

Amine 18 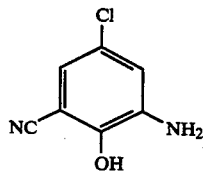

Amine 19 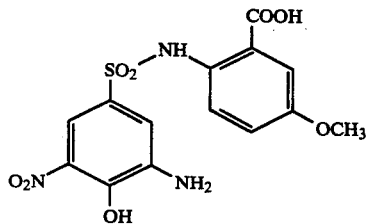

Amine 20 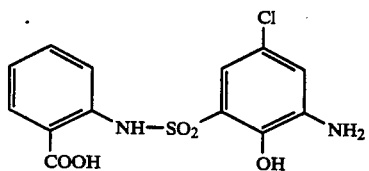

Amine 21 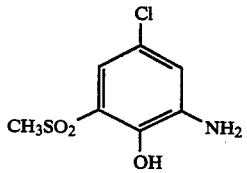

Amine 22 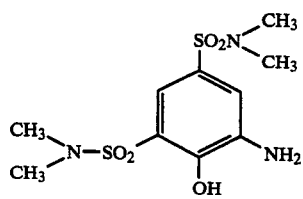

Amine 23 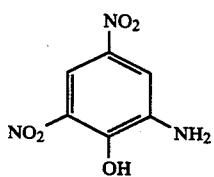

Amine 24 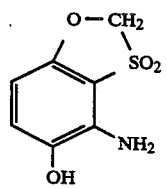

Amine 25 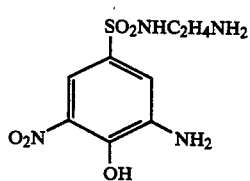

For other suitable diazo components, see DE-A-3,107,540.

The following are examples of suitable coupling components: 2-amino-5-chloro-3-pyridinol, 2-amino-5-bromo-3-pyridinol and the corresponding pyridines substituted by alkyl or aryl in the 4-position. A description of methods of obtaining these compounds is given by Mattern in Helv. Chim. Acta 60 (1977), pages 2062 to 2070. Additional information may be found in the chapter entitled "Pyridinols and Pyridones" in Volume XIV of the series "Chemistry of heterocyclic compounds; Pyridine and its derivatives" Supplement Part 3, pages 597 et seq.

DYE 1

39.1 g of 3-amino-4-hydroxy-5-nitro-benzene sulphonic acid amide hydrochloride are stirred up in a mixture of 200 ml of water and 22 ml of concentrated hydrochloric acid and diazotised at from 0° to 5° C. with a solution of 10.3 g of sodium nitrite in 20 ml of water. After destruction of a slight excess of nitric acid with amidosulphonic acid, the suspension of yellow diazonium compound is added to a solution of 27.5 g of 2-amino-3-hydroxy-5-bromopyridine in 200 ml of dimethylformamide and adjusted to a pH of about 10 using 10% sodium hydroxide solution. When coupling has been completed, the pH is adjusted to from 6 to 7 using dilute hydrochloric acid or acetic acid, and the dye is filtered off. After thorough washing with water, 53–57 g of Dye 1 ($\lambda_{max}$ 568 nm, determined in methanol) are obtained after drying.

DYE 2

0.01 ml=4.33 g of Dye 1 is stirred up in 50 ml of dimethylformamide (DMF), and 0.01 mol=1.38 g of powdered potassium carbonate and 0.01 ml=1.1 g of thiophenol are added. After the reaction mixture has been heated to about 40° C., replacement of the bromine atom by the phenylthio group is completed within about 10 minutes. The end of the reaction may easily be determined by the thin layer chromatography. The reaction product is precipitated by the addition of 100 ml of water and 50 ml of a 5% sodium chloride solution, and is then filtered off and washed free from salt with water. 4.1 g of dye 2 ($\lambda_{max}$=528 nm, determined in methanol) are obtained after drying.

DYE 5

0.01 mol of Dye 1 are reacted with 0.01 mol=1.24 g of benzyl mercaptan in a mixture of DMF and potassium carbonate as described for Dye 2. Replacement of the bromine atom by the benzyl thio group may be achieved simply by stirring at room temperature for 1 hour. The reaction product is precipitated with 5% sodium chloride solution and filtered off. 4.5 g of Dye 5 ($\lambda_{max}$=590 nm, determined in methanol) are obtained after drying

DYE 4

0.013 mol=1.3 g of methane sulphinic acid sodium in the form of an approximately 50% aqueous solution is added to the solution of 0.01 mol of Dye 1 in 50 ml of DMF, and the mixture is stirred at room temperature. Replacement of the bromine atom monitored by thin layer chromatography is completed after about 1 hour. Isolation of the reaction product is carried out as for Dye 5 ($\lambda_{max}$=588 nm, determined in methanol).

DYE 7

0.01 mol of Dye 1, 50 ml of DMF and 0.015 mol=2.46 g of benzene sulphinic acid sodium in the form of a 70% aqueous paste are stirred together at room temperature for 2 hours. According to thin layer chromatography, the reaction is then complete. Isolation of the dye is carried out as for Dye 5 ($\lambda_{max}=558$ nm, determined in propanol/water 1:1).

DYE 8

0.04 mol=17.32 g of Dye 1, 0.056 mol=7.48 g of 3-amino-6-methoxy-benzene sulphinic acid, 0.056 mol=7.73 g of powdered potassium carbonate, 200 ml of DMF and 5.6 ml of water are stirred together for 3 hours at 40° C. According to thin layer chromatography, the reaction is then complete. The reaction mixture is adjusted to pH 5-6 with dilute acetic acid, and 250 ml of water are added. The precipitated reaction product is filtered off and freed from salt by washing with water. 20 g of Dye 8 ($\lambda_{max}=510$ nm, determined in methanol) are obtained after drying.

DYE 11b ($R^5=CAR^1$)

When 0.01 mol=1.25 g of 4-aminothiophenol is used for the reaction with Dye 1 instead of the thiophenol used for the preparation of Dye 2, the reaction product obtained consists of 4.6 g of a dye having the following constitution:

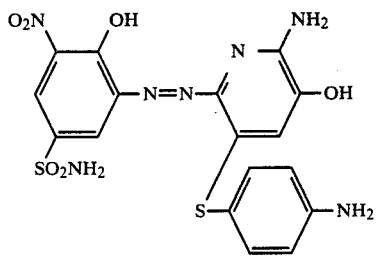

0.01 mol=4.77 g of this dye are stirred with 100 ml of absolute pyridine, and 0.011 mol=6.74 g of CARRIER SULPHOCHLORIDE is added in the course of 45 minutes. The reaction mixture is stirred at room temperature and the progress of the reaction is followed by thin layer chromatography. The reaction is completed after about 4 hours. The reaction product is precipitated with 5% sodium chloride solution, filtered off, repeatedly washed with water and then dried. 9 g of Dye 11b (=Dye-releaser 1) are obtained ($\lambda_{max}=412$ nm, determined in methanol).

The CARRIER SULPHOCHLORIDE used as intermediate product corresponding to the following formula:

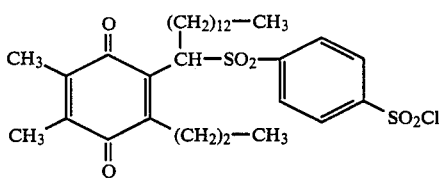

is prepared as follows:

20 g of 2,3-dimethyl-5-propyl-6-[α-(4-aminobenzene sulphonyl)-tetradecyl]-benzoquinone-(1,4) in 100 ml of glacial acetic acid are diazotised with 2.7 g of sodium nitrite at 15° C. after the addition of 10 ml of concentrated hydrochloric acid. The reaction mixture is treated with
0.5 g of amidosulphonic acid and introduced at 10° C. into a solution of
35 ml of liquid SO₂ and
1.5 g of copper-II-chloride in
100 ml of glacial acetic acid. The reaction mixture is heated to 20° C. and then stirred for 2 hours. The solid product precipitated with
100 ml of water is suction filtered, washed till neutral, dried and recrystallised from ethyl acetate/hexane. Yield 20 g.

DYE 12b ($R^5=CAR^1$)

0.01 mol=5.39 g of Dye 8, 1.38 g of powdered potassium carbonate and 100 ml of anhydrous dimethylformamide are stirred together, and 0.011=6.7 g of CARRIER SULPHOCHLORIDE is added portionwise in the course of from 45 to 60 minutes. The reaction product is worked-up by the same method as Dye 11b after it has been stirred for 4 hours at room temperature.

Yield: 11 g of Dye 12b (dye-releaser 2). ($\lambda_{max}=412$ nm, determined in methanol).

DYE 16

0.01 mol of Dye 1, 0.011 mol=1.5 g of powdered potassium carbonate, 0.011 mol=1.22 g of 2-mercaptopyrimidine and 50 ml of anhydrous DMF are stirred together at room temperature for 4 hours. The reaction mixture is then adjusted to pH 5-6 with dilute acetic acid, and 200 ml of water are added. The precipitated reaction product is filtered off, washed with water and dried. 3.7 g of Dye 16 are obtained ($\lambda_{max}=540-570$ nm, determined in methanol).

DYE 35

When 0.011 mol=1.4 g of 2-mercapto-4-aminopyridine is used instead of 2-mercaptopyrimidine, otherwise using the same procedure as for the preparation of Dye 16, 3.9 g of Dye 35 are obtained.

DYE 36

(a) Diazo component (Amine 25)

276.5 g of 2-methyl-4-nitrobenzoxazole-6-sulfochloride are added in portions with stirring at 80° C. to a mixture of 1000 ml of ethylenediamine and 300 ml of water. The temperature is maintained for one further hour. The next day the dark-red solution is evaporated in vacuo and the residue is stirred at 100° C. for two hours with 500 ml of 20% soda lye. After neutralization with concentrated hydrochloric acid to pH 6 the red-yellow precipitate is suction filtered. After dissolution in concentrated hydrochloric acid and precipitation on dilution with water the compound has a melting point of 210° C.

Similarly, starting with 1,3-diaminopropane, 1,4-diaminobutane or piperazine the corresponding diazo components can be prepared. The diazo components can be further subjected to diazotiazation and coupling to form the corresponding Br-dyes as outlined below with the example of amine 25.

(b) Br-dye 8.0 g of amine 25 are dissolved in 100 ml of water and 5 ml of 40% soda lye. After addition of 2.0 g of NaNO₂ the dark-red solution obtained is poured with stirring onto a mixture of 100 g of ice and 65 ml of concentrated hydrochloric acid. After stirring for 1 hour pH 2 is adjusted with a solution of sodium carbonate and stirring is continued for 2 further hours. No nitrite can be found in the solution. 5.48 g of 2-amino-3-hydroxy-5-bromopyridine, dissolved in 50 ml of DMF and 50 ml of water are added to the solution described above and pH 7 is adjusted with a solution of sodium carbonate within 1 hour. After standing over night the Br-dye is filtered.

(c) Dye 36

28.6 g of Br-dye are dissolved in 1000 ml of DMF together with addition of 15 g of potassium carbonate and are reacted with 7.8 ml of 4-methoxythiophenol. After exchange of bromine which proceeds rapidly (as determined by thin layer chromatography) 27.4 g of dye 36 are obtained at pH 7.

Dye-releaser 9

5.3 g of dye 36 are dissolved in 50 ml of DMF together with 1.8 ml of triethylamine. 6.1 g of CARRIER SULFOCHLORIDE are added within 15 minutes at room temperature. After completion of the reaction as determined by TLC the mixture is poured on ice/HCl and the dye is isolated by suction-filtration. On purification by chromatography over silica gel using $CH_2Cl_2$/methanole 10:1 as eluent 5.8 g of dye-releaser 9 are obtained.

Dye-releaser 12

12.2 g of CARRIER SULFOCHLORIDE are added in portions to a solution of 9.52 g of Br-dye mentioned in the preparation of dye 36, in 100 ml of DMF. 3.0 ml of triethylamine are added so slowly that the blue color is just maintained. After 60 minutes the mixture is poured on ice/HCl and suction-filtered. 10.5 g of the dye obtained are dissolved in 50 ml on DMF and are mixed with 1.8 g of 4-methoxybenzene sulfinic acid. Thereafter, 1,4 g of $K_2CO_3$ are added. After completion of the reaction and working-up 7.8 g of dye-releaser 12 are obtained.

The dye-releasers according to the present invention incorporated in a colour photographic recording material for the dye diffusion transfer process are placed in association with a light-sensitive silver halide emulsion layer. For a monochromatic process, such a recording material contains at least one, and for the production of multicoloured images generally at least three light-sensitive silver halide emulsion layers, which in the latter case have differing spectral sensitivities, and, according to the present invention, a dye-releaser corresponding to general formula (IV) is associated with at least one of these layers. When development takes place, the dye-releasers release diffusible dyes which, after diffusing into a receptor layer, undergo complex formation with nickel ions to form cyan image dyes. The dye-releasers according to the present invention are therefore preferably associated with a red-sensitive silver halide emulsion layer.

By "association" and "associated" is meant that the light-sensitive silver halide emulsion layer and dye-releaser are arranged in such a relationship to each other that when development takes place, interaction between them is possible so that the diffusible monoazo dye which is capable of complex formation with nickel ions may be released as a function of the development of the silver halide emulsion layer. The light-sensitive silver halide and the dye-releaser need not necessarily be present in the same layer for this purpose; they may also be accommodated in adjacent layers belonging to the same layer unit.

When the dye-releasers according to the present invention are reducible compounds which are split up by reduction and are preferably used together with ED compounds (or precursors thereof, e.g. according to DE-A-3,006,268), the term "association" means that the silver halide emulsion, ED compound or ED precursor, and dye-releaser are so arranged in relation to each other that they are capable of interacting to produce an imagewise correspondence between the silver image formed and the consumption of ED compound on the one hand and between unused ED compound and dye-releaser on the other hand, so that an imagewise distribution of diffusible dye is produced in correspondence with the undeveloped silver halide.

Although various methods may be used for incorporating the dye-releasers according to the present invention, it has been found advantageous to incorporate the present dye-releasers in the layers in the form of emulsions, using so-called "oil-formers". It is particularly when reducible dye-releasers capable of being split by reduction are used in combination with ED compounds that this has the advantage that the dye-releasers and ED compounds may be brought into exceptionally close functional contact with each other in the form of a common emulsion. Suitable oil-formers have been described, for example, in U.S. Pat. No. 2,322,027, DE-A-1,772,192, DE-A-2,042,659 and DE-A-2,049,689. The optimum quantities of dye-releaser to be incorporated and optionally also of ED compound may be determined by simple routine tests. The dye-releaser according to the present invention may be used, for example, in quantities of from 0.05 to 0.2 mol and the ED compound, if present, in quantities of from 0.1 to 0.6 mol per mol of silver halide.

Development of the colour photographic recording material according to the present invention after imagewise exposure is initiated by a treatment with an aqueous alkaline, optionally highly viscous developer solution. The auxiliary developer compounds required for development are either contained in the developer solution or they may be partly or completely present in one or more layers of the colour photographic material according to the present invention. When development takes place, diffusible dyes are released imagewise from the dye-releasers and transferred to an image receptor layer which may be either an integral constituent of the colour photographic recording material according to the present invention or in contact with this material, at least during the time of development. The image receptor layer may therefore be arranged on the same layer support as the light-sensitive element or on a separate layer support. It consists substantially of a binder containing mordant for fixing the diffusible dyes which are released from the non-diffusible dye-releasing compounds. The mordants used for anionic dyes are preferably long-chained quaternary ammonium or phosphonium compounds, e.g. those described in U.S. Pat. No. 3,271,147 and U.S. Pat. No. 3,271,148. Certain metal salts and hydroxides thereof capable of forming sparingly soluble compounds with the acid dyes may also be used. Polymeric mordants should also be mentioned, such as those described in DE-A-2,315,304, DE-A-2,631,521 of DE-A-2,941,818. The dye mordants are dispersed in the mordant layer in one of the conventional hydrophilic binders, e.g. in gelatine, polyvinyl pyrrolidone or partially or completely hydrolysed cellulose esters. Some binders may, of course, themselves function as mordants, e.g. polymers of nitrogen-containing quaternary bases, such as 2-methyl-4-vinylpyridine, 4-vinylpyridine or 1-vinylimidazole, as described, for example, in U.S. Pat. No. 2,484,430. Examples of other suitable mordanting binders include guanyl hydrazone derivatives of alkyl vinyl ketone polymers, such as those described, for example, in U.S. Pat. No. 2,882,156, and guanyl hydrazone derivatives of acyl styrene polymers as described, for example, in DE-A-2,009,498, but the last-mentioned mordanting binders would generally be used in combination with other binders, e.g. gelatine.

In the present case, the image receptor layer or a layer adjacent thereto may contain heavy metal ions, in particular nickel ions, which form the appropriate azo dye metal complex with the monoazo dyes diffusing into that layer, thus providing the above-mentioned advantageous properties as regards absorption and stability. The nickel ions may be present in a complex-bound form in the image receptor layer, e.g. bound to certain polymers, as described, for example, in Research Disclosure 18 435 (September 1979) or in DE-A-3,002,287 and DE-A-3,105,777. Alternatively, the azo dye-metal complexes may be produced after diffusion into the image receptor layer by treating the image receptor layer containing the imagewise distribution of dyes according to the present invention with a solution of a salt of one of the above-mentioned heavy metals. The dye-releasers which are left behind in association with the originally light-sensitive layers after development (as negative to the transferred image) may also be converted into the corresponding azo dye-metal complexes by treatment with nickel ions ("retained imge"). In either case, the colour image produced with the colour photographic material according to the present invention consists of an imagewise distribution of nickel complexes of the dye-releasers according to the present invention or of the azo dyes released therefrom, and optionally other dyes which, if present, are fixed in the image receptor layer by the mordants contained therein.

If the image receptor layer is to remain in contact with the light-sensitive element after development has been complete, an alkali-permeable, light-reflecting layer of binder containing pigment is generally placed between these two layers to serve as optical separation between the negative and positive and provide an aesthetically-pleasing image background for the transferred colour image. Such a light-reflective layer may, in known manner, be preformed in the light-sensitive colour photographic recording material or it may be produced in the course of development, by a method which is also known. If the image receptor layer is arranged between the layer support and the light-sensitive element and is separated from the latter by a preformed light reflective layer, then the layer support must either be transparent so that the dye transfer image produced may be viewed through this layer or the light-sensitive element must be removed from the image receptor layer together with the light-reflective layer to expose the image receptor layer. On the other hand, the image receptor layer may be placed as uppermost layer in an integral colour photographic recording material, in which case exposure is advantageously carried out through the transparent layer support.

EXAMPLE 1

Dyes according to the present invention are compared with known dyes as regards spectral data and lightfastness. The Tables below indicate in each case the maximum absorption wavelength ($\lambda_{max}$ and the percentage yellow subsidiary density ($SD_Y$) and magenta subsidiary density ($SD_M$) of the nickel complexes, based on the main absorption, as well as the percentage reduction in colour density on exposure in the Xeno test apparatus.

IMAGE RECEPTOR SHEET

An image receptor sheet was prepared by applying the following layers to a paper support which had been coated with polyethylene on both sides and covered with an adhesive layer. The figures given are based on 1 m².

1. A mordant layer containing 6 g of a polyurethane according to Example 3 of DE-A-2,631,521 and 5 g of gelatine.
2. A hardening layer containing 0.1 g of gelatine and 0.15 g of instant hardener:

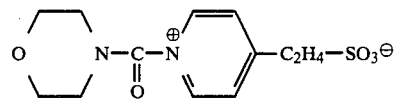

One strip of each of the image receptor materials obtained was immersed in a 0.03 molar dye solution which had been made alkaline with 2% sodium hydroxide solution, and the strip was coloured to a density of from 1.2 to 1.5 (determined in a reflection densitometer RD 514/Macbeth behind a red filter).

The dyes shown in the following Table were used.

After the immersion treatment, the samples were washed with demineralized water and metallized by immersion in a 2% nickel acetate solution.

All the samples were then washed under running water, after-treated with a 2% succinic acid buffer solution (pH 6) are dried.

Each colour strip was then half covered and exposed to Xenon light ($4.8.10^6$ 1$\times$.h). The percentage reduction in density $$\frac{\Delta D}{D_o}$$

is shown in the following Table.

TABLE

| Dye | $\lambda_{max}$(nm) | $SD_Y$(%) | $SD_M$(%) | $\frac{\Delta D}{D_o}$ (%) |
|---|---|---|---|---|
| 2 | 660 | 17 | 30 | −13 |
| 3 | 665 | 19 | 31 | −11 |
| 4 | 656 | 14 | 30 | −16 |
| 5 | 668 | 18 | 35 | ±0 |
| 6 | 665 | 19 | 35 | −14 |
| 7 | 660 | 16 | 31 | −13 |
| 8 | 655 | 23 | 36 | −12 |
| 9 | 665 | 27 | 37 | −6 |
| 14 | 668 | 21 | 34 | −7 |
| 16 | 655 | 20 | 35 | −10 |
| 17 | ·666 | 19 | 31 | −14 |
| 20 | 664 | 20 | 30 | −4 |
| 31 | 538 | 19 | 33 | −10 |
| 32 | 662 | 20 | 31 | −11 |
| A | 631 | 24 | 48 | −11 |
| B | 650 | 20 | 38 | −30 |
| C | 648 | 23 | 38 | −40 |
| D | 668 | 35 | 38 | −38 |
| E | 644 | 19 | 31 | −38 |

Comparison dyes not according to the present invention Dye A (=DE-A-3,107,540, Dye 2)

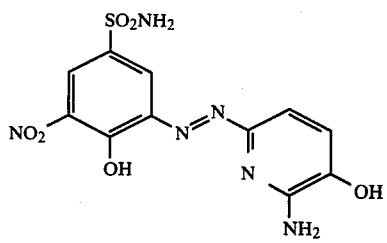

Dye B (Dye 1)
Dye C (DE-A-2,740,719, dye from dye-releaser 26)

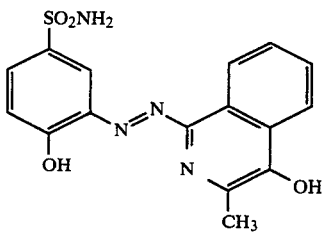

Dye D (DE-A-3,107,540, Dye D)

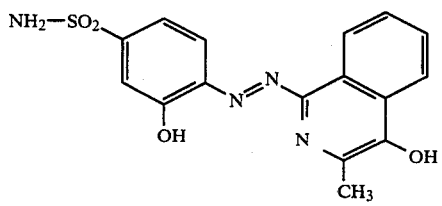

Dye E (U.S. Pat. No. 4,346,161)

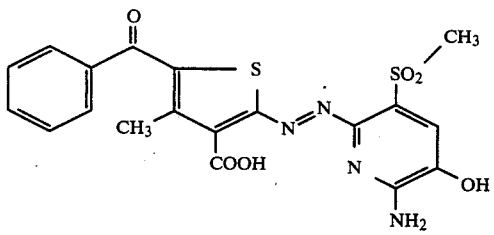

The Table clearly shows the superiority of the dyes according to the present invention as regards the cyan shade of nickel complexes and the excellent level of light fastness which is equal to and in some cases even superior to that of the aminopyridinol azophenols of DE-A-3,107,540.

EXAMPLE 2

Light-sensitive element 1 (not according to the present invention)

The following layers were applied in succession to a paper support which was coated with polyethylene on both sides. All figures are based on 1 m².

1. A red-sensitized silver iodobromide emulsion layer (silver application corresponding to 0.97 g $AgNO_3$) containing 0.35 g of dye F which is not according to the present invention (dye-releaser 1 of DE-A-3,107,540), 0.22 g of ED compound 6 (compound 4 of DE-A-3,006,268), 0.55 g of palmitic acid diethylamide and 1.15 g of gelatine.

2. A protective layer containing 0.6 g of the monoacetylation product of 4-methyl-4-hydroxymethylphenidone and 0.6 g of gelatine.

3. A hardening layer containing 0.1 g of gelatine and 0.12 g of the instant hardener indicated in Example 1.

Light-sensitive elements 2 to 4 (according to the present invention)

The light-sensitive elements 2 to 4 differ from element 1 in that dye F is replaced in each case by the following:

Light-sensitive element 2: 0.42 g of Dye 11,
Light-sensitive element 3: 0.44 g of Dye 24,
Light-sensitive element 4: 0.45 g of Dye 12.

One strip of each of the light-sensitive elements 1 to 4, measuring in each case 30×35 cm, was exposed imagewise through a graduated wedge and treated, together with a strip of the same size of the image receptor sheet according to Example 1, with a treatment solution having the composition indicated below, and the two strips were then pressed together with the active surfaces in contact:

Treatment solution:
912 g of water
40 g of potassium hydroxide
3 g of potassium bromide
25 g of 2,2-methyl-propyl-propane-1,3-diol and
20 g of 1,4-cyclohexane-1,4-dimethanol.

After a contact time of 2 minutes, the sheets were separated and the image receptor sheet was immersed in a 2% aqueous solution of nickel acetate for 2 minutes after it had been washed with demineralized water. The image receptor sheets were then washed and dried for 5 minutes.

The data obtained are summarized in the following Table.

| Light-sensitive element | Dye-releaser (dye) | $\lambda_{max}$(nm) | $D_{min}$ | $D_{max}$(R) | $D_{max}$(G) | $D_{max}$(B) | $\frac{\Delta D}{D_o}$ |
|---|---|---|---|---|---|---|---|
| 1 not according to the present invention | F (DE-OS 3,107,540) | 640 | 0.14 | 1.80 | 0.70 (38%) | 0.45 (25%) | −17% |
| 2 (according to the present invention) | 11 | 660 | 0.19 | 1.90 | 0.60 (31%) | 0.42 (22%) | −20% |
| 3 (according to the present invention) | 24 | 665 | 0.16 | 1.60 | 0.51 (32%) | 0.38 (24%) | −25% |
| 4 (according to the present invention) | 12 | 655 | 0.14 | 1.65 | 0.59 (36%) | 0.38 (23%) | −22% |

In the Table
  $D_{max}(R)$ = the maximum density behind red filter (Macbeth RD 514)
  $D_{max}(G)$ = the maximum density behind green filter
  $D_{max}(B)$ = the maximum density behind blue filter The relationship $D_{max}(G)/D_{max}(R)$ gives the subsidiary density in terms of the % of the density behind the red filter.

$$\frac{\Delta D}{D_o}$$

denotes the percentage loss in density after exposure in the Xeno test apparatus for 72 hours, determined at density 1.0.

The results clearly show that the nickel complexes of the dyes according to the present invention provide clearer cyan shades than the known nickel complex without giving rise to an undesirable loss in light-fastness. The yellow and magenta subsidiary densities which may be calculated from the ratios $D_{max}(G)/D_{max}(R)$ and $D_{max}(B)/D_{max}(R)$ are in all three cases lower than in the known nickel complex.

We claim:

1. A color photographic recording material for the production of color images by the dye diffusion transfer process, comprising, associated with at least one light-sensitive silver halide emulsion layer, a non-diffusible color-providing compound from which a diffusible 6-arylazo-2-amino-3-pyridinol dye capable of complex formation with metal ions is released as a function of the development of the silver halide emulsion layer under conditions of alkaline development, wherein the improvement comprises the 6-arylazo-2-amino-3-pyridinol dye corresponds to the following general formula (I):

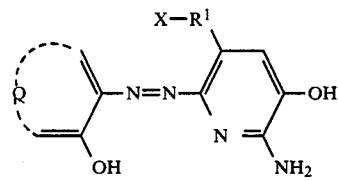

wherein
  Q represents the group required for completing a substituted or unsubstituted phenyl or naphthyl group;
  X represents —S—, —SO$_2$—; and
  R$^1$ represents an aliphatic, araliphatic or a carbocyclic or heterocyclic aromatic group.

2. Recording material as claimed in claim 1 wherein the 6-arylazo-2-amino-3-pyridinol dye corresponds to the following general formula (II):

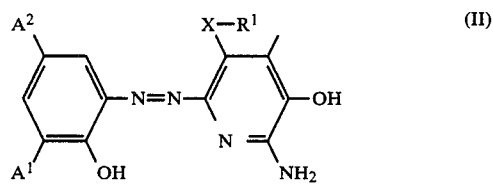

wherein
  X represents —S—, —SO$_2$—;
  R$^1$ represents an aliphatic, araliphatic or a carbocyclic or heterocyclic aromatic group; and
  A$^1$ and A$^2$ represent substituents having electron acceptor properties.

3. Recording material as claimed in claim 2 wherein in general formula (II), A$^1$ represents a comparatively strong electron acceptor and A$^2$ a comparatively weak electron acceptor.

4. Recording material as claimed in claim 2 wherein in general formula (II), A$^1$ represents —NO$_2$, —CN or —SO$_2$R$^3$; A$^2$ represents halogen, —SO$_2$—R$^4$, —CF$_3$ or COOH; and R$^3$ and R$^4$ represent —OH, amino, alkyl or aryl.

* * * * *

UNITED STATES PATENT AND TRADEMARK OFFICE
CERTIFICATE OF CORRECTION

PATENT NO. : 4,579,817
DATED : Apr. 1, 1986
INVENTOR(S) : Peter Bergthaller, Gerhard Wolfrum, Holger Heidenreich It is certified that error appears in the above—identified patent and that said Letters Patent is hereby corrected as shown below:

The inventor "Gerhard Wolfrüm" should read -- Gerhard Wolfrum --

In the ABSTRACT, the right-hand side of Formula I should read

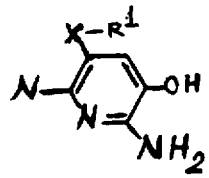

Column 2, Line 26 "—NR—°, R$^1$" should read -- —NR°—, R$^1$ --

Column 18, Formula for Dye 36 appears in Column 18 and not in Column 17.

Column 31, Line 26 "imge" should read -- image --

Column 36, in Claim I the right-hand side of Formula I should read

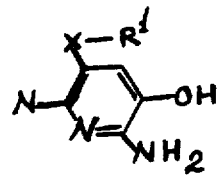

Signed and Sealed this

Thirteenth Day of February, 1990

Attest:

JEFFREY M. SAMUELS

Attesting Officer      Acting Commissioner of Patents and Trademarks